United States Patent
Sakashita

(10) Patent No.: US 8,119,033 B2
(45) Date of Patent: Feb. 21, 2012

(54) GRANULATED ACETYLENE BLACK, PROCESS FOR PRODUCING IT AND ITS COMPOSITION

(75) Inventor: Hiroshi Sakashita, Omuta (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 247 days.

(21) Appl. No.: 12/446,394

(22) PCT Filed: Oct. 19, 2007

(86) PCT No.: PCT/JP2007/070470
§ 371 (c)(1),
(2), (4) Date: Apr. 20, 2009

(87) PCT Pub. No.: WO2008/047917
PCT Pub. Date: Apr. 24, 2008

(65) Prior Publication Data
US 2010/0320424 A1 Dec. 23, 2010

(30) Foreign Application Priority Data
Oct. 20, 2006 (JP) .................................. 2006-285977

(51) Int. Cl.
*H01B 1/04* (2006.01)
*H01B 1/24* (2006.01)

(52) U.S. Cl. ..................... 252/511; 252/502; 423/449.1; 423/449.2; 423/450

(58) Field of Classification Search .................. 252/511, 252/502; 423/449.1, 449.2, 450
See application file for complete search history.

(56) References Cited

U.S. PATENT DOCUMENTS

| | | | | |
|---|---|---|---|---|
| 4,608,244 A | * | 8/1986 | Sugihara et al. | 423/449.1 |
| 5,973,059 A | * | 10/1999 | Yamazaki et al. | 524/495 |
| 6,025,429 A | * | 2/2000 | Yamazaki et al. | 524/495 |

FOREIGN PATENT DOCUMENTS

| | | | |
|---|---|---|---|
| JP | 1-58227 | | 12/1989 |
| JP | 1569964 | | 7/1990 |
| JP | 9-255892 | | 9/1997 |
| JP | 9-296071 | | 11/1997 |
| JP | 11-353941 | | 12/1999 |
| JP | 2001-49027 | | 2/2001 |
| JP | 3406470 | | 3/2003 |
| JP | 2003268258 A | * | 9/2003 |
| JP | 2004-182803 | | 7/2004 |
| JP | 2004210846 A | * | 7/2004 |

* cited by examiner

*Primary Examiner* — Douglas Mc Ginty
(74) *Attorney, Agent, or Firm* — Oblon, Spivak, McClelland, Maier & Neustadt, L.L.P.

(57) ABSTRACT

The present invention provides a granulated acetylene black which can be easily and well dispersed when it is incorporated in at least one of a resin and a rubber, the process for producing it, and its composition. A granulated acetylene black has an average aspect ratio of at most 1.1, an average maximum particle size of from 0.2 mm to 1 mm and an average particle size of from 0.2 to 0.6 mm. The granulated acetylene black is produced, after stirring and granulating a mixture containing from 35 to 50 mass % of an acetylene black original powder having an iodine adsorption amount of from 80 to 100 mg/g and a DBP absorption amount of from 140 to 220 ml/100 g and from 50 to 65 mass % of water, and subjecting to selection treatment, classification treatment or both treatments.

15 Claims, No Drawings

GRANULATED ACETYLENE BLACK, PROCESS FOR PRODUCING IT AND ITS COMPOSITION

TECHNICAL FIELD

The present invention relates to a granulated acetylene black, a process for producing it and its composition.

BACKGROUND ART

An acetylene black is a carbon black having a high purity and having few factors for inclusion of impurities among many carbon blacks, and it has high crystallinity and a developed structure. Therefore, it is excellent in ability to impart electrical conductivity, and it is incorporated in at least one of a resin and a rubber to impart electrical conductivity, or preferably employed as an electrical conductive agent for a battery.

Since an acetylene black just produced (hereinafter referred to as "an acetylene black original powder") has a small bulk density and scattering properties, it is commonly used as granulated to improve the handling efficiency (Patent Documents 1 and 2).
Patent Document 1: Japanese Patent 1,569,964
Patent Document 2: Japanese Patent 3,406,470

DISCLOSURE OF THE INVENTION

Object to be Accomplished by the Invention

It is an object of the present invention to provide a granulated acetylene black which is excellent in dispersibility in a resin or a rubber, a process for producing it, and its composition.

Means to Accomplish the Object

The present inventors have conducted extensive studies to accomplish the above object, and as a result, the present invention having the following gist has been accomplished.
1. A granulated acetylene black having an average aspect ratio of at most 1.1, an average maximum particle size of from 0.2 mm to 1 mm and an average particle size of from 0.2 to 0.6 mm.
2. The granulated acetylene black according to the above 1, which has a hardness of from 2 to 8 gf/piece in accordance with method A of JIS K 6219-3:2006.
3. The granulated acetylene black according to the above 1 or 2, which has an average aspect ratio of at most 1.1, an average maximum particle size of from 0.2 mm to 0.8 mm and an average particle size of from 0.3 to 0.5 mm.
4. A process for producing the granulated acetylene black as defined in any one of the above 1 to 3, which comprises stirring and granulating a mixture containing from 35 to 50 mass % of an acetylene black original powder having an iodine adsorption amount of from 80 to 100 mg/g and a DBP absorption amount of from 140 to 220 ml/100 g and from 50 to 65 mass % of water, and subjecting the obtained granulated product to selection treatment, classification treatment or both treatments.
5. The process for producing the granulated acetylene black according to the above 4, wherein the acetylene black original powder has an iodine adsorption amount of from 85 to 95 mg/g and an DBP absorption amount of from 160 to 200 ml/100 g.
6. A composition comprising the granulated acetylene black as defined in any one of the above 1 to 3 contained in at least one of a resin and a rubber.
7. The composition according to the above 6, which contains from 5 to 150 parts by mass of the granulated acetylene black per 100 parts by mass of at least one of the resin and the rubber.
8. The composition according to the above 6 or 7, wherein the resin is a polystyrene resin, an ethylene/vinyl acetate copolymer resin or a polyethylene resin.
9. The composition according to the above 6 or 7, wherein the rubber is natural rubber, silicone rubber or butyl rubber.

Effect of the Invention

According to the present invention, it is possible to provide a granulated acetylene black which can be easily and well dispersed in a composition when it is incorporated in at least one of a resin and a rubber to prepare the composition, the process for producing it, and its composition comprising the granulated acetylene black, the resin and/or the rubber.

BEST MODE FOR CARRYING OUT THE INVENTION

If the average aspect ratio of the granulated acetylene black of the present invention exceeds 1.1, even if a composition comprising the granulated acetylene black contained in at least one of the resin and the rubber (hereinafter this composition will be referred to simply as "the composition") is prepared, the granulated acetylene black shows only dispersibility equivalent to that of the conventional one. As a result, it becomes difficult for the granulated acetylene black to penetrate into the matrix of the resin or the rubber, and the electrical conductivity of the composition is not sufficiently improved. Further, at the time when the granulated acetylene black is transferred to a hopper or the like of an extruder or the like, it is likely that the speed becomes low and clogging may occur.

The aspect ratio is a value obtained by dividing the maximum diameter of one particle by the minimum diameter thereof. As the aspect ratio becomes closer to 1, the particle becomes more spherical. In the present invention, the closer the aspect ratio becomes to 1, the better it is. "An average aspect ratio of at most 1.1" recited in the present invention means that the average value of the aspect ratio of 50 pieces of particles collected at random is at most 1.1. The average aspect ratio of the granulated acetylene black of the present invention is more preferably at most 1.09, particularly preferably at most 1.06.

The aspect ratio is obtained by photographing by using a microscope ("tradename Microscope VH5910" manufactured by Keyence Corporation) connected with a video printer (tradename "Video Printer NV-MP5" manufactured by Matsushita Electric Industrial Co., Ltd.), measuring the maximum diameter and the minimum diameter based on the image, and dividing the maximum diameter by the minimum diameter.

When the average maximum particle size of the granulated acetylene black exceeds 1 mm, the time for mixing and pulverization to small particles in the composition becomes longer. The upper limit of the average maximum particle size is more preferably 0.9 mm, particularly preferably 0.8 mm. The lower limit of the average maximum particle size is 0.2 mm, particularly preferably 0.3 mm.

On the other hand, the average particle size of the granulated acetylene black is from 0.2 to 0.6 mm. If the average particle size is less than 0.2 mm, at the initial stage of mixing to prepare the composition, it is likely that the pulverized granulated acetylene black coagulates again. If the average particle size exceeds 0.6 mm, the time for mixing and pulverization to small particles in the composition becomes longer. The average particle size is preferably from 0.3 to 0.5 mm, particularly preferably from 0.3 to 0.4 mm.

The average maximum particle size and the average particle size of the granulated acetylene black in the present invention are measured as follows. Firstly, the particle size distribution is measured in accordance with JIS K 6219-4: 2006. Specifically, 5 kinds of screens having screen mesh openings of 0.125 mm, 0.25 mm, 0.5 mm, 1.0 mm and 2.0 mm are stacked, and 100 g of a sample is put on the top screen, followed by sieving by operation of a low-tap type screening machine (tradename "Model B" manufactured by HEIKO-SEISAKUSHO Corporation) for 1 minute, whereupon the masses are measured for the respective screen mesh openings, and their ratios are obtained. Then, on the basis that the particle size of 0.125 mm screen minus mesh product is 0.0625 mm, the particle size of 0.125 mm screen plus mesh–0.25 mm screen minus mesh product is 0.1875 mm, the particle size of 0.25 mm screen plus mesh–0.5 mm screen minus mesh product is 0.375 mm, the particle size of 0.5 mm screen plus mesh–1.0 mm screen minus mesh product is 0.75 mm, the particle size of 1.0 mm screen plus mesh–2.0 mm screen minus mesh product is 1.5 mm and the particle size of 2.0 mm screen plus mesh product is 2 mm, these particle sizes are multiplied by the respective ratios obtained above and the average particle size is obtained by adding the obtained values. Further, the maximum particle size is measured by selecting a particle having the maximum size among the particles on the screen having the maximum mesh opening.

The above measurements are conducted for 5 samples, and the average values are obtained and taken as the average particle size and the average maximum particle size.

The granulated acetylene black of the present invention is constituted to have an average aspect ratio of at most 1.1, an average maximum particle size of 1 mm and an average particle size of from 0.2 to 0.6 mm. Further, the hardness of its granulated particles (particle hardness) in accordance with method A of JIS K 6219-3:2006 is preferably from 2 to 8 gf/piece and particularly preferably from 3 to 6 gf/piece.

In the process for producing the granulated acetylene black of the present invention, when an acetylene black original powder is granulated with water as a binder, one having an iodine adsorption amount of from 80 to 100 mg/g and a DBP absorption amount of from 140 to 220 ml/100 g is used as the acetylene black original powder. Such an acetylene black original powder may be produced, for example, in accordance with Examples 1 to 4 of Patent Document 1.

If the iodine adsorption amount in the acetylene black original powder is less than 80 mg/g, the contact area with the resin or the rubber becomes small and the viscosity of the composition becomes low, whereby the dispersibility and the electrical conductivity are not improved. Further, if the iodine adsorption amount exceeds 100 mg/g, the viscosity of the composition becomes too high and the composition undergoes deterioration and the structure of the acetylene black is cut, whereby the electrical conductivity becomes low. The iodine adsorption amount in the acetylene black original powder is preferably from 85 to 95 mg/g.

On the other hand, if the DBP absorption amount in the acetylene black original powder is less than 140 ml/100 g, the viscosity of the composition becomes low because of the poor development of the structure, whereby the dispersibility and the electrical conductivity are not improved. Further, if the DBP absorption amount exceeds 220 ml/100 g, the viscosity of the composition becomes too high and the composition undergoes deterioration and the structure of the acetylene black is cut, whereby the electrical conductivity becomes low. The DBP absorption amount in the acetylene black original powder is preferably from 160 to 200 ml/100 g.

By using water as a binder together with the acetylene black original powder, the granulated acetylene black of the present invention is produced. That is, a mixture of the acetylene black original powder and water is stirred and granulated by using a stirring and granulating machine, such as Henschel mixer or a continuous granulation machine. When an organic type binder as a binder is used as described in the Patent Document 1 instead of water, the granulated particles become too hard and the dispersibility in the composition is not improved. However, an organic type binder may be used supplementarily.

With respect to the proportions of the acetylene black original powder and water in the mixture, the acetylene black original powder is preferably 35 to 50 mass %, particularly preferably 37 to 48 mass %, and water is preferably 50 to 65 mass %, particularly preferably 52 to 63 mass %. When the proportion of water is less than 50 mass % (the proportion of the acetylene black original powder is over 50 mass %), granulation becomes difficult, and when the proportion of water exceeds 65 mass % (the proportion of the acetylene black original powder is less than 35 mass %), it becomes difficult to adjust the average maximum particle size of the granulated particle to at most 1 mm. The amount of water is particularly preferably from 52 to 63 mass %.

To the stirred and granulated mixture of the acetylene black original powder and water, if necessary, an organic solvent such as methanol or ethanol, or an organic binder such as polyvinyl alcohol may be added.

Then, the granulated acetylene black of the present invention is produced by subjecting the obtained granulated particles to selection treatment, classification treatment or both treatments. In order to select the particles having the average aspect ratio of at most 1.1 from the granulated particles, it is preferred to roll particles down from the top of, for example, a stainless steel or resin plate (for example, the length is from 5 to 30 cm, the width is from 5 to 30 cm) adjusted to an inclination angle at preferably from 3 to 10 degrees, and collecting the particles arriving at the bottom.

Further, classification of the granulated acetylene black having an average maximum particle size of 1 mm and an average particle size of from 0.2 to 0.6 mm is preferably conducted by a screen classification system using a screen having a specific mesh opening.

The composition of the present invention comprises the granulated acetylene black on the present invention contained in at least one of a resin and a rubber. As an example of the mixing method, a method may be mentioned wherein mixing by a mixer such as a blender or Henschel mixer, is further followed, if necessary, by kneading by e.g. a heat roll, a kneader or a single screw or twin screw extruder. Further, as an example of the mixing ratio, the granulated acetylene black is from 5 to 150 parts by mass, preferably from 10 to 140 parts by mass, based on 100 parts by mass of at least one of the resin or the rubber.

The resin to be used in the present invention may, for example, be as a common plastic, an olefinic resin such as polypropylene, polyethylene, an ethylene/vinyl acetate copolymer resin, an ethylene/vinyl alcohol resin, polymethylpentene or a cyclic olefin copolymer; a vinyl chloride type resin such as polyvinyl chloride or an ethylene/vinyl chloride copolymer resin; a styrene type resin such as polystyrene, a styrene/acrylonitrile copolymer resin or an acrylonitrile/butadiene/styrene copolymer resin; or an acrylic resin such as polymethyl methacrylate. A common engineering plastic may, for example, be polyethylene terephthalate, a thermoplastic polyester such as polybutylene terephthalate, polyamide, polyacetal, polycarbonate or modified polyphenylene ether. Further, a super engineering plastic may, for example, be polytetra fluoroethylene, a fluororesin such as polyvinylidene fluoride, polyphenylene sulfide, a liquid crystal polymer, polyarylate, thermoplastic polyimide, a ketone type resin or a sulfonic resin. Furthermore, other resins may, for example, be a phenol resin, a urea resin, a melamine resin, unsaturated polyester, an alkyd resin, a silicone resin, an epoxy resin, a urethane resin, polyvinyl ester, polyimide, a furan resin, a xylene resin, a thermosetting reinforced plastic or a polymer alloy.

Especially, in the present invention, a resin such as a polystyrene resin, an ethylene/vinyl acetate copolymer resin or a polyethylene resin is preferably employed.

Further, as a rubber, e.g. a natural rubber, a styrene butadiene rubber, an acrylonitrile butadiene rubber, a butyl rubber, an acryl rubber, an ethylene propylene rubber, an ethylene propylene terpolymer, an ethylene/α-olefin copolymer rubber, a silicone rubber, a fluororubber, a thermoplastic elastomer such as polyester, a chloroprene rubber, a polybutadiene rubber, a hydrin rubber or chlorosulfonate polyethylene may be mentioned.

Especially, in the present invention, a natural rubber, a silicone rubber, a butyl rubber or an acryl rubber is preferably employed.

EXAMPLES

Now, the present invention will be described in further detail with reference to Examples. However, the present invention is by no means restricted thereto.

Example 1

An acetylene gas was supplied to a vertical thermal decomposition furnace at a speed of 15 m/s and was thermally decomposed at 2,400° C. to produce an acetylene black original powder. To 39 parts by mass of this acetylene black original powder, 61 parts by mass (61 mass %) of deionized water was added, followed by stirring and granulating at a stirring speed of 1,100 rpm for 5 minutes by a high speed Henschel mixer (tradename "10B" manufactured by Mitsui Miike Machinery Co., Ltd.; 9 litters of capacity), and the granulated product was left to stand and dried for 20 hours in a dryer maintained at a temperature of 150° C. The granulated particles were subjected to the following selection and classification to obtain a granulated acetylene black. The selection was conducted by rolling granulated particles down at a rate of 20 g per 1 minute from the top of a stainless steel plate (10 cm in length, 5 cm in width) adjusted to an inclination angle of 8 degree and collecting the particulates arriving at the bottom. The classification was conducted by sieving the particles though a screen having a mesh opening of 1.1 mm.

Comparative Example 1

A granulated acetylene black was produced in a same manner as in Example 1 except that granulated particles were not subjected to either the selection or classification treatment.

Example 2

A granulated acetylene black was produced in a same manner as in Example 1 except that the classification was conducted by sieving through a screen having a mesh opening of 1.2 mm.

Example 3

A granulated acetylene black was produced in a same manner as in Example 1 except that the selection was conducted by using a stainless steel plate (10 cm in length, 5 cm in width) adjusted to an inclination angle of 3 degree.

Examples 4 to 6 and Comparative Examples 2 to 5

An acetylene gas was thermally decomposed in a same manner as in Example 1 except that a nitrogen gas was supplied to the furnace to adjust the decomposition temperature of an acetylene gas at a level of from 1,800 to 2,400° C. and the acetylene gas was supplied at a speed of from 4 to 20 m/s, thereby to obtain various kinds of acetylene black original powders different in the iodine adsorption and DBP absorption as shown in Table 2. A granulated acetylene black was produced in a same manner as in Example 1 except for using these acetylene black original powders.

Examples 7 to 9 and Comparative Examples 6 and 7

A granulated acetylene black was produced in a same manner as in Example 1 except that deionized water was adjusted to the proportion as shown in Table 3.

With respect to the obtained granulated acetylene black, the following physical properties were measured. These results are shown in Table 1 (Examples 1 to 3, Comparative Example 1), Table 2 (Examples 4 to 6, Comparative Examples 2 to 5) and Table 3 (Examples 7 to 9, Comparative Examples 6 and 7).

(1) Average aspect ratio: The average value of 50 pieces of particles was obtained in accordance with the above-described method.

(2) Average particle size: The average value of 5 pieces of samples was obtained in accordance with the above-described method.

(3) Average maximum particle size: The average value of 5 pieces of samples was obtained in accordance with the above-described method.

Further, the maximum particle size was obtained by photographing by using a microscope (tradename "Microscope VH5910" manufactured by Keyence Corporation) connected with a video printer (tradename "Video Printer NV-MP5" manufactured by Matsushita Electric Industrial Co., Ltd.) and measuring the maximum diameter based on the image.

(4) Hardness of granulated particles (particle hardness): It was measured in accordance with method A of JIS K 6219-

3:2006. When the particle diameter of a sample was less than 1 mm, the 20 pieces of biggest particles were selected and measured.

(5) Pulverization ratio: 10 g of a sample (granulated acetylene black) and 40 g of polystyrene resin pellets (tradename "H-700" manufactured by Toyo Styrene Co., Ltd.) were put on a 0.125 mm screen, followed by sieving by operation of a low-tap type screening machine for 1 minute and the ratio of screen minus was obtained. The pulverization ratio is an index of fragilities of granulated particles. As the pulverization ratio is high, the granulated particles are pulverized in a short time and well dispersed in the composition well during premixing with a resin or a rubber, or during putting into a kneading machine.

(6) Volume Resistivity of Composition

30 Parts by mass of a sample and 100 parts by mass of polystyrene resin pellets (tradename "H-700" manufactured by Toyo Styrene Co., Ltd.) were kneaded by using a kneading test machine (tradename "Labo Plastomill 50MR" manufactured by Toyo Seiki Seisaku-sho, Ltd.) having a capacity of 60 ml with a blade rotational number of 30 rpm at a temperature of 180° C. for 7 minutes. The obtained kneaded product was subjected to press molding at a temperature of 180° C. under a pressure of 15×10$^6$ Pa to obtain a test piece of 2 mm×20 mm×70 mm. With respect to the test piece, the volume resistivity was measured by using a digital multi meter (tradename "Digital Multi Meter 7562" manufactured by Yokogawa Electric Corporation) in accordance with SRIS2301.

(7) The Number of Hard Spots on a Sheet Surface

The kneaded product produced in the above (6) was palletized by strand-cut method, and a sheet having a thickness of 0.3 mm was prepared by using an small single screw extruder equipped with Labo Plastomill 50MR at a temperature of 180° C. The sheet was cut to 10 cm square, and then, the number of hard spots on the surface of the sheet (protrusions consisting of the acetylene black coagulated product on the sheet surface) was visually counted. The measurement was conducted for 3 samples to obtain the average value.

TABLE 1

| | | Ex. 1 | Ex. 2 | Ex. 3 | Comp. Ex. 1 |
|---|---|---|---|---|---|
| Acetylene black original powder | Iodine adsorption amount (mg/g) | 92 | 92 | 92 | 92 |
| | DBP absorption amount (ml/100 g) | 188 | 188 | 188 | 188 |
| Granulated acetylene black | Average aspect ratio (—) | 1.09 | 1.08 | 1.02 | 1.18 |
| | Average particle size (mm) | 0.45 | 0.57 | 0.44 | 0.69 |
| | Average maximum particle size (mm) | 0.92 | 0.98 | 0.93 | 1.52 |
| | Hardness of granulated particles (gf/piece) | 4.2 | 5.2 | 4.5 | 5.8 |
| Physical properties | Pulverization ratio (mass %) | 38 | 30 | 36 | 13 |
| | Volume resistivity (Ω cm) | 13.6 | 15.6 | 13.2 | 23.0 |
| | Number of hard spots (number/ 10 cm square) | 3 | 8 | 4 | 28 |

TABLE 2

| | | Ex. 4 | Ex. 5 | Ex. 6 | Comp. Ex. 2 | Comp. Ex. 3 | Comp. Ex. 4 | Comp. Ex. 5 |
|---|---|---|---|---|---|---|---|---|
| Acetylene black original powder | Iodine adsorption amount (mg/g) | 82 | 88 | 95 | 73 | 114 | 82 | 139 |
| | DBP absorption amount (ml/100 g) | 159 | 189 | 202 | 148 | 212 | 136 | 240 |
| Granulated acetylene black | Average aspect ratio (—) | 1.06 | 1.08 | 1.07 | 1.13 | 1.02 | 1.08 | 1.12 |
| | Average particle size (mm) | 0.57 | 0.55 | 0.28 | 0.58 | 0.18 | 0.81 | 0.16 |
| | Average maximum particle size (mm) | 0.94 | 0.88 | 0.85 | 1.05 | 0.82 | 1.04 | 0.92 |
| | Hardness of granulated particles (gf/piece) | 5.4 | 4.9 | 3.5 | 5.5 | 3.9 | 6.2 | 4.0 |
| Physical properties | Pulverization ratio (mass %) | 24 | 28 | 35 | 15 | 39 | 18 | 36 |
| | Volume resistivity (Ω cm) | 15.6 | 14.3 | 19.5 | 21.9 | 23.0 | 21.5 | 20.6 |
| | Number of hard spots (number/10 cm square) | 6 | 4 | 8 | 14 | 12 | 15 | 24 |

TABLE 3

| | | Ex. 7 | Ex. 8 | Ex. 9 | Comp. Ex. 6 | Comp. Ex. 7 |
|---|---|---|---|---|---|---|
| Condition for granulating | Content of deionized water (mass %) | 53 | 58 | 64 | 48 | 67 |
| Granulated acetylene black | Average aspect ratio (—) | 1.07 | 1.05 | 1.08 | 1.14 | 1.09 |
| | Average particle size (mm) | 0.38 | 0.40 | 0.54 | 0.32 | 0.75 |
| | Average maximum particle size (mm) | 0.72 | 0.83 | 0.96 | 0.51 | 1.08 |
| | Hardness of granulated particles (gf/piece) | 3.5 | 3.7 | 4.9 | 3.0 | 5.5 |

TABLE 3-continued

|  |  | Ex. 7 | Ex. 8 | Ex. 9 | Comp. Ex. 6 | Comp. Ex. 7 |
|---|---|---|---|---|---|---|
| Physical properties | Pulverization ratio (mass %) | 28 | 23 | 21 | 32 | 13 |
|  | Volume resistivity (Ω cm) | 16.4 | 17.9 | 19.8 | 23.2 | 24.5 |
|  | Number of hard spots (number/ 10 cm square) | 1 | 6 | 8 | 12 | 18 |

The comparison between Examples and Comparative Examples as shown in Tables 1 to 3 shows that with respect to the granulated acetylene black produced in the Examples of the present invention, when it was mixed with a resin (polystyrene), the particles were broken in a short time and uniformly mixed easily, and it was highly dispersed in the resin when kneaded by an extruder. Therefore, the volume resistivity of the composition of the present invention became small, and the sheet produced by using the composition of the present invention had small number of hard spots.

The experiment was conducted in accordance with Examples 1 or 2 except that a natural rubber was used instead of the polystyrene resin, and excellent effects equivalent to the ones in Example 1 or 2 were obtained.

INDUSTRIAL APPLICABILITY

The granulated acetylene black of the present invention can be employed not only as an electrical conductivity imparting agent to a resin/rubber, but also as a coating, an electrical conductive agent for a battery such as a primary battery, a secondary battery, a fuel battery or a capacitor, an antistatic agent and an electrical conductive agent for an electrical conductive paper.

The entire disclosure of Japanese Patent Application No. 2006-285977 filed on Oct. 20, 2006 including specifications, claims and summaries is incorporated herein by reference in its entirety.

The invention claimed is:

1. A granulated acetylene black having an average aspect ratio of at most 1.1, an average maximum particle size of 0.2 mm to 1 mm, and an average particle size of 0.2 to 0.6 mm, and a hardness of 3 to 6 gf/piece in accordance with method A of JIS K 6219-3:2006.

2. A granulated acetylene black having an average aspect ratio of at most 1.1, an average maximum particle size of 0.2 mm to 1 mm, an average particle size of 0.2 to 0.6 mm, and a hardness of 4.2 to 8 gf/piece in accordance with method A of JIS K 6219-3:2006.

3. The granulated acetylene black according to claim 1, which has an average aspect ratio of at most 1.1, an average maximum particle size of 0.2 mm to 0.8 mm and an average particle size of 0.3 to 0.5 mm.

4. A process for producing the granulated acetylene black as defined in claim 1, the process comprises stirring and granulating a mixture comprising from 35 to 50 mass % of an acetylene black original powder having an iodine adsorption amount of 80 to 100 mg/g and a DBP absorption amount of 140 to 220 ml/100 g and from 50 to 65 mass % of water, thereby obtaining a granulated product, and subjecting the obtained granulated product to selection treatment, classification treatment or both treatments.

5. The process for producing the granulated acetylene black according to claim 4, wherein the acetylene black original powder has an iodine adsorption amount of 85 to 95 mg/g and an DBP absorption amount of 160 to 200 ml/100 g.

6. A composition comprising the granulated acetylene black as defined in claim 1 and at least one of a resin and a rubber.

7. The composition according to claim 6, which comprises from 5 to 150 parts by mass of the granulated acetylene black per 100 parts by mass of the at least one of a resin and a rubber.

8. The composition according to claim 6 or 7, wherein the resin is at least one resin selected from the group consisting of a polystyrene resin, an ethylene/vinyl acetate copolymer resin, and a polyethylene resin.

9. The composition according to claim 6 or 7, wherein the rubber is at least one rubber selected from the group consisting of natural rubber, silicone rubber, and butyl rubber.

10. The process for producing the granulated acetylene black according to claim 4, wherein the iodine adsorption amount is from 80 to 92 mg/g.

11. The granulated acetylene black according to claim 1, wherein the average particle size is from 0.3 to 0.4 mm.

12. A process for producing a granulated acetylene black, the process comprises stirring and granulating a mixture comprising from 35 to 50 mass % of an acetylene black original powder having an iodine adsorption amount of 80 to 100 mg/g and a DBP absorption amount of 140 to 220 ml/100 g and from 50 to 65 mass % of water, thereby obtaining a granulated product, and subjecting the obtained granulated product to selection treatment, classification treatment or both treatments,
   wherein the mixture comprises from 37 to 48 mass % of the acetylene black original powder, and
   wherein the granulated acetylene black has an average aspect ratio of at most 1.1, an average maximum particle size of 0.2 mm to 1 mm, and an average particle size of 0.2 to 0.6 mm.

13. A process for producing a granulated acetylene black comprising from 52 to 63 mass % of water, the process comprises stirring and granulating a mixture comprising from 35 to 50 mass % of an acetylene black original powder having an iodine adsorption amount of 80 to 100 mg/g and a DBP absorption amount of 140 to 220 ml/100 g and from 50 to 65 mass % of water, thereby obtaining a granulated product, and subjecting the obtained granulated product to selection treatment, classification treatment or both treatments,
   wherein the granulated acetylene black has an average aspect ratio of at most 1.1, an average maximum particle size of 0.2 mm to 1 mm, and an average particle size of 0.2 to 0.6 mm.

14. The process for producing the granulated acetylene black according to claim 4, wherein the DBP absorption amount is from 160 to 200 ml/100 g.

15. The process for producing the granulated acetylene black according to claim 4, wherein the amount of an iodine adsorption is from 85 to 95 mg/g.

* * * * *